March 20, 1951  B. B. BUCKINGHAM ET AL  2,545,647
POWER LAWN MOWER

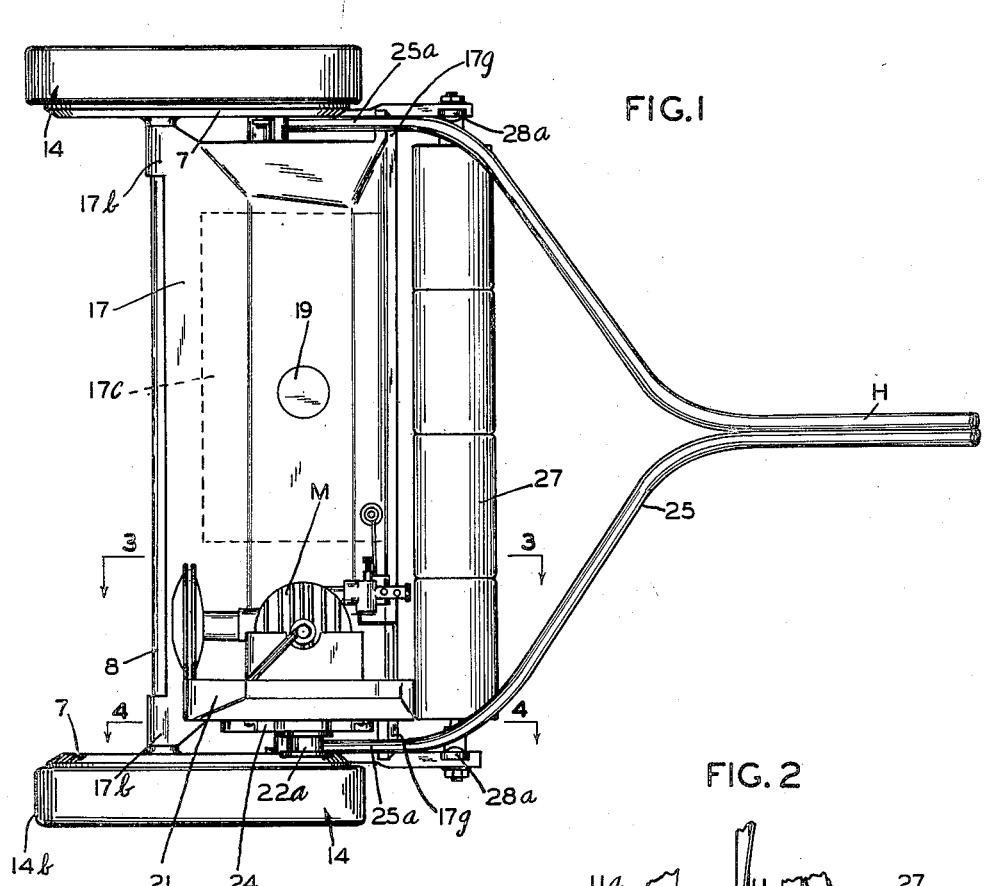
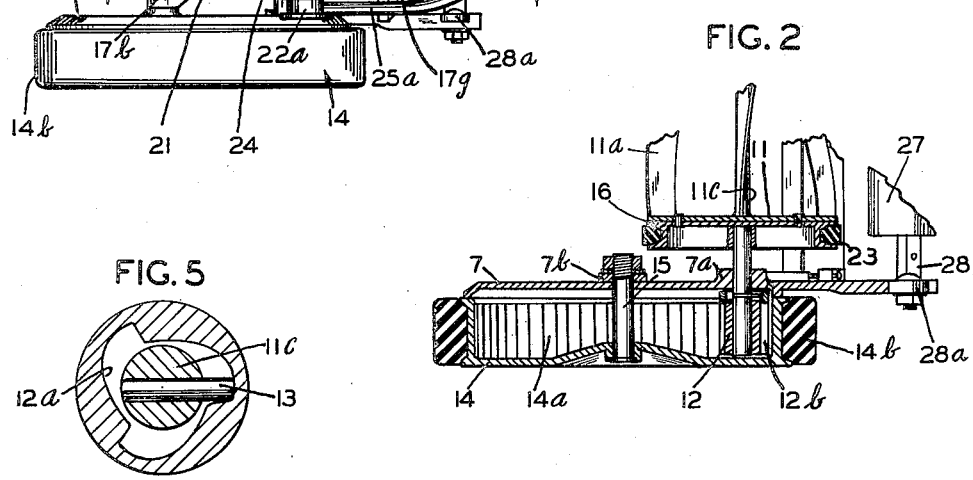
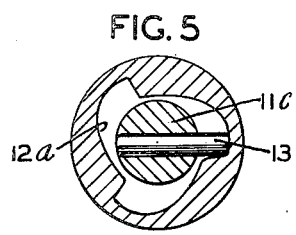
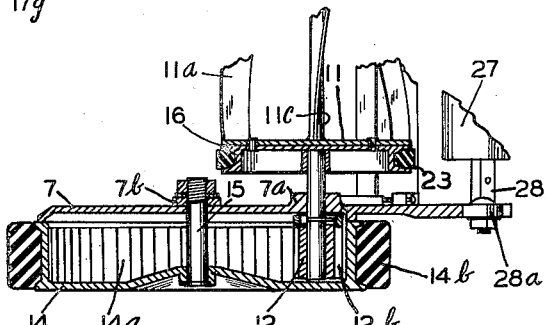

Filed June 16, 1947  2 Sheets-Sheet 2

Inventors
BUHEL B. BUCKINGHAM
RALPH K. VILES
By Williamson & Williamson
Attorney Patented Mar. 20, 1951

2,545,647

UNITED STATES PATENT OFFICE 2,545,647

POWER LAWN MOWER

Buhel B. Buckingham and Ralph K. Viles,
Minneapolis, Minn.

Application June 16, 1947, Serial No. 754,950

5 Claims. (Cl. 56—26)

This invention relates to power lawn mowers of the rotary cutter reel type and particularly to an improved, simplified construction which is light in weight and adapted for manufacture at comparatively low cost.

It is an object of our invention to provide a very simplified, highly efficient power mower of the class described, which eliminates the need for the clutch mechanism, chain or driving gear connections and hand-operated controls, the application of power to the cutter reel and traction wheels of the mower being controlled as well as the guiding of the mower in operation by normal use of the ordinary elongated guiding handle itself, of the mower.

A further object of the invention is the provision of a very compact and highly efficient power unit and driving control assembly mounted at the top of the mower frame over the cutter reel and containing an engine or motor, a fuel tank and all elements of the engine, driving connections and controls and mounted in such a manner as to permit quick removal thereof by merely loosening two attachment elements to facilitate sharpening of the reel blades and the bed knife or to facilitate the repair of parts included in such assembly.

Another object is to provide a highly efficient power mower having a combined engine support and power application control member pivoted for limited swinging movement to the front tie rod of the mower and having limited movement at the rear edge of the support which is less than the related movement of the usual lawn mower guiding handle with a relationship between the handle and the support to cause an endless driving belt to be slackened when the guiding handle is allowed to drop to some extent from its normal raised position of operation, thereby disconnecting driving engagement between the engine and cutter reel and whereby, when the effect of the guiding handle upon the support is removed, resilient means interposed between the center of the support and the frame of the mower, raise the rear or free end of the support to tension the belt for driving and in so doing, to connect power to the cutter reel and mower with gradual application thereof.

A still further object is the provision of a restrictively swingable engine support pivoted on a front tie bar of the mower and supported approximately at its vertical center by a spring interposed between a rear tie bar and the bottom of said engine support in such a manner as to produce driving tension on an endless belt extending from the engine takeoff to a pulley on the cutter reel located directly therebelow, such tension causing gradual application of power from the engine to the cutter reel and the driving of the traction wheels of the mower from the cutter reel when the supporting spring is released and being controlled by normal movements of the elongated guiding handle of the mower of conventional structure through a leverage action of the handle on a portion of the engine support which takes place when the handle is released and swings downwardly through gravity, thereby relieving tension on the belt.

Another object is the provision in a rotary power mower of an engine support so constructed and cooperatively associated with the frame and guiding handle of the mower that the tensioning of a V-belt by spring pressure applied upwardly against the central portion of the pivoted support will make available an opposing force caused by the power of the engine to produce a slight downward movement of the support, causing slackening of the V-belt and idling of the engine if the operation of the driven pulley of the cutter reel and consequently of the V-belt, is suddenly brought to a stop by an obstruction between the blade of the reel and the bed knife, thus permitting the engine to idle without shattering the reel or any of the working parts and only imparting the force of the momentum of the reel and V-belt and a negligible additional force from the power of the engine against the obstruction.

It is another object to provide in a power mower of the class described, an engine support and control assembly combined with a simple guide handle control without utilizing extra levers to effect the operation of the mower in a manner to permit the weight thereof to be distributed to the wheels and roller without influence from the operator, during normal running and to also readily permit a shifting of this weight to the wheels alone to provide for increased traction whenever needed and to further, permit a shifting of this weight to the roller alone to eliminate traction of the wheels when it is desired to move the mower in a rearward direction, such shiftings of the weight of the mower as well as control of the driving connections being accomplished by merely changing the handle height.

More specifically, it is an object to provide a very closely cooperating relationship between a restrictively pivoted motor support assembly and a simple, elongated handle to guide the mower with a preferably V-belt driving connection between the motor and the cutter reel which through change of height of the elongated guiding handle itself, without manipulation of any extraneous controls, causes gradual application of power for driving the working mechanism as well as shifting of the weight of the mower for the purposes described in the preceding paragraph.

A still further object is the provision of a structure of the class described wherein adjustment for the normal operating height of the important guiding handle may be obtained and in this connection, two sets of pivot elements for connection of said handle, utilized in a dual capacity to furnish abutments whereby the total weight of the mower frame may be shifted upon the traction wheels or the rear roller, as described.

More generally, it is an object to provide a greatly simplified and highly efficient reel-type power mower with mechanical elements so combined that the maneuverability of the mower over difficult terrain is substantially similar and as simple as that of a hand mower of the common type, thereby eliminating need for involved instructions or experience on the part of the operator and further, enabling the operator to stop the forward movement of the mower instantly at any point he desires.

These and other objects and advantages of our invention will be more apparent from the following description made in connection with the accompanying drawings wherein like reference characters refer to similar parts throughout the several views and in which:

Fig. 1 is a top plan view showing an embodiment of our invention;

Fig. 2 is an enlarged fragmentary, horizontal section taken through one end of the mower along a line passing through the axis for the traction wheels and also the axis of the cutter reel;

Fig. 5 is an enlarged detail cross section showing the driving engagement between the cutter reel shaft and the traction wheels of the mower.

Figure 3:
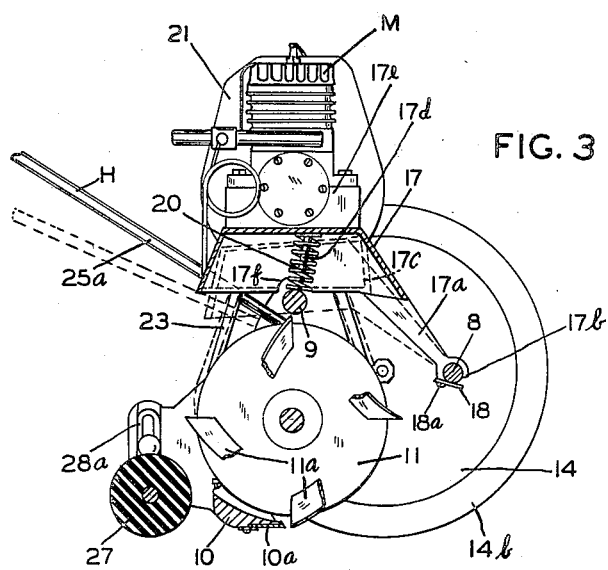
Fig. 3 is a vertical cross section taken substantially along the line 3—3 of Fig. 1.

In the form of the invention illustrated, a lawn mower frame, for the most part, of conventional construction, is provided, having a pair of widely spaced side walls or frame plates 7, secured together and spaced apart at the upper and forward portions by means of a conventional, transverse front tie rod 8 and at the upper and intermediate portions of the frame sides, by a transverse rear tie rod 9. An adjustable transverse bed plate 10 is mounted for oscillation between the lower portions of the frame plates 7 and has detachably mounted in a rabbeted portion of the underside thereof, the sharpened bed knife 10a with which the cutter reel cooperates.

The cutter reel, as shown, is of well known construction comprising a pair of spaced discs 11 radially slotted from their peripheries inwardly for some distance to seat and secure the spirally arranged cutter blades 11a. The cutter reel includes the rigid axially disposed shaft 11c having the terminal extensions which are journaled in suitable bearing bosses 7a provided by the frame side plates 7 and which at their ends, are surrounded by wheel-driving pinions 12 of conventional structure, drivably engaged by driving pins or dogs 13 slidably mounted in diametric passages through the medial end portions of cutter reel shaft 11. The driving dogs 13 engage the usual ratchet like internal cooperating portion or track 12a of the driving pinions and are adapted to drive the pinions 12 when the cutter reel is driven for cutting and to permit over-running of said pinion when the traction wheels of the mower are turned forwardly by manual pushing. In other words, the driving connection between the cutter reel and traction wheels 14 are reversed from their ordinary positions as used in hand-propelled mowers so that the cutter reel drives the traction wheels 14 through meshing of the teeth 12b of the driving pinions with the internal gear 14a of the traction wheels. The two traction wheels 14 of the mower have rigidly secured to the rims thereof, rubber tires 14b as shown and are journaled to bossed bearing portions 7b of the frame sides by heavy, stub axles 15, said wheels as shown, being in the form of shallow, cylindrical shells with the inner edges thereof disposed in close contact with cooperating flanges cast or otherwise formed in the outer faces of the frame sides 7, to thereby enclose the driving connections previously described.

A V-belt pulley 16 is affixed to one end of the cutter reel being as shown, riveted or otherwise secured to the left hand disc 11 of the reel.

We provide a highly efficient and readily removable power unit and driving control assembly cooperatively related with the cutter reel and the elongated guiding handle of the mower, indicated as an entirety by the letter H. This assembly includes a rectangular, substantially horizontal motor supporting platform 17 constructed as shown, in the form of an inverted shell and disposed above the cutter reel at the top of the mower frame and supported by the front and rear tie rods 8 and 9 respectively and occupying the greater part of the space between the vertical frame sides or plates 7. At the front edge of platform 17, a pair of forwardly and downwardly extending hanger straps or arms 17a are provided adjacent the ends of the platform, terminating in semi-cylindrical bearing hooks 17b which overlie and pivotally engage the end portions of the front tie rod 8. The said hanger arms 17a are detachably secured to front tie rod 8 by quickly releasable means such as the forwardly extending short plates 18 bolted to the lower and rearward edge of the bearing hook 17b by bolts 18a.

The greater portion of the length of platform 17 is enclosed and provided with a bottom to form, interiorly, a gasoline or fuel tank 17c indicated by the dotted lines in Fig. 1, said tank being provided with a threaded filling aperture normally closed by a removable cap 19.

The bottom portion of platform shell 17 is transversely recessed some distance from the left hand end of the embodiment illustrated, to accommodate an upstanding coil supporting spring 20 which surrounds the depending pin 17d fixed to the top of the platform and which is interposed between the top of platform 17 and the rear tie rod 9 at approximately the vertical center of the mower frame. Coil spring 20 is of adequate strength to yieldingly support the platform 17 with tank 17c filled with fuel as well as the motor or engine M which is mounted in upright position at the left hand portion of platform 17 upon an upstanding boss 17e, furnished by the platform and disposed directly above the spring-accommodating recess, said spring 20 also having adequate strength to tension the driving belt. The motor is provided with a fly wheel secured to its crank shaft (not shown) which fly wheel is housed in a vertical shell casing 21 disposed at the left hand end of the platform. The left hand or power take-off end of the crank shaft is provided with a V-belt pulley 22 disposed directly above the V-belt pulley 16 fixed to the cutter reel, the ratio between the diameters of pulleys 16 and 22 being, as shown, slightly greater than 4 to 1. An endless V-belt 23 is trained about pulleys 22 and 16 and is of a length to be tensioned when the supporting platform is free to be urged upwardly in its restricted swinging movement upon the front tie rod 8 through the action of supporting spring 20. Downward swinging of the platform 17 is limited by engagement of the lower edge of portions of the shell platform with the rear tie rod 9, as shown, a plurality of semi-circular recesses 17f being provided for accommodating the tie rod. An inverted V-shaped belt-retaining and guiding plate 24 is disposed in close spaced relation to the upper loop of V-belt 23, being secured to the outer face of fly wheel casing 21, by attachment feet at the lower ends thereof. The V-belt 23 is thus normally tensioned by the spring 20 to drive the cutter reel and through the cutter reel, the traction wheels of the mower, when no factor is present to depress the rearward edge of platform 17.

Figure 4:
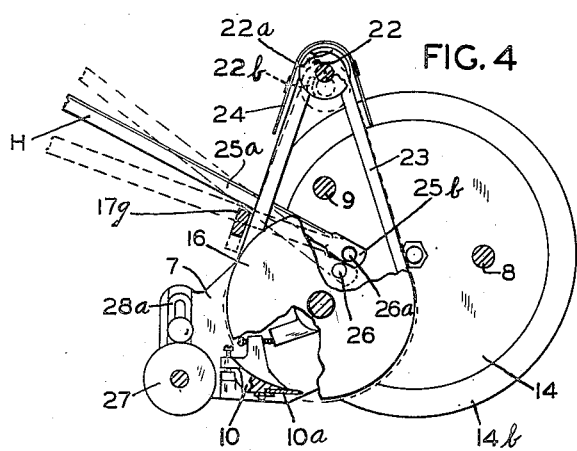
Fig. 4 is a vertical cross section taken substantially along the line 4—4 of Fig. 1 and showing the adjustable, pivotal mounting for the front end of the guiding handle and the combinative relationship of the handle with the motor support assembly.
Figure 6:
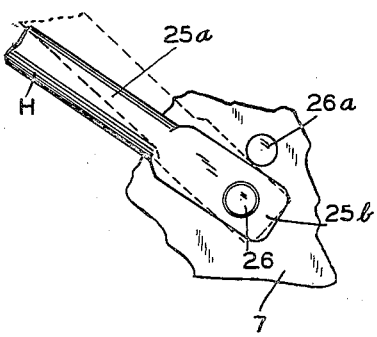
Fig. 6 is a fragmentary detail elevation illustrating the pivotal connection of one of the forward arms of the guiding handle with one of the frame sides and the cooperating relationship of the adjacent pivot stud.

To control the application of driving power to the reel and traction wheels and to further, cooperate with the mower frame and platform for other controls, as will more fully appear, we provide an elongated guiding handle of substantially the general structure conventionally used in manually pushed lawn mowers. The specific handle H illustrated comprises a pair of elongated rod members 25 welded together in side by side relation throughout the greater portions of their length and having out-turned hand grip extremities (not shown) provided with rubber hand pieces. The forward ends of rods 25 are extended outwardly and then forwardly to provide a widely bifurcated pivotal attachment for the handle to the frame. The bifurcated ends or arms 25a of the handle terminate in vertically flatted attachment ends which are circularly apertured as shown in Figs. 4 and 5, closely adjacent their extremities 25b. The frame sides 7 are provided with two sets of opposed, horizontally aligned pivot studs 26 and 26a respectively, the lower and upper studs of each plate being precisely related and spaced to furnish an adjustment in the normal height of the guiding handle and to further, in combination, be utilized as stop or abutment means to limit both upward and downward swinging of the handle, as will hereafter be explained in detail. The rods 25 in the form of handle illustrated, have sufficient resiliency to enable the forward arms 25a to be sprung inwardly towards each other to facilitate pivotal connection of the apertures formed in the outer ends thereof with either set of pivot studs 26 or 26a.

The forward, widely spaced arms 25a of handle H, it will be noted, extend in closely spaced relationship to the side wall members 7 of the mower frame and overlie or overhang horizontal abutment extensions 17g formed at the rear or free edge of the supporting platform 17. As shown, said abutment extensions 17g are integrally formed with the platform 17 and constitute short arms extended horizontally and transversely of the mower frame adjacent the lower edge of the rear of platform 17 and in the path of the forward handle arms 25a. The over-all weight of handle H and leverage factor is such that when handle H is released, the tension of supporting coil spring 20 will be overcome and the platform 17 will be swung downwardly slightly below normal operating position, as shown by the dotted lines in Fig. 3, thereby slackening the endless V-belt 23 and permitting idling of the engine and disconnecting the driving of the cutter reel and the traction wheels 14. In idling position, the handle is disposed somewhat below the normal position conveniently assumed when the mower is being guided for cutting. When handle H is raised slightly by the operator for convenient positioning to guide the mower, the weight thereof is removed from the abutment extension 17g at the rear edge of platform 17 and the supporting coil spring 20 urges the platform upwardly, tensioning the driving belt 23 and gradually and uniformly applying power to the cutter reel through pulley 16. The upward swinging of handle H relative to the frame of the mower is limited when the flatted forward ends of the handle are pivoted to the upper sets of pivot studs 26b, abutment of the lower edge of the extremities 25b with the lower pivot studs 26, thereby enabling the mower frame to be tilted forwardly by hand to impose the entire weight upon the traction wheels 14. The downward movement of the handle is limited by abutment of the supporting platform 17 against the rear tie rod 9 whereby the mower frame may be tilted backwardly, imposing the weight thereof, entirely upon the rear roller 27 which, as shown, is of conventional type supported in transverse bearings 28 which are vertically adjustable to a desired, fixed elevation through the medium of upstanding, slotted arms 28a bolted to the rearwardly extending portions of the frame sides 7.

Any suitable means for starting the engine or motor M may be provided such as the flanged pulley 22a attached to the outer end of the motor crank shaft and adapted to accommodate the starting rope and provided with a retaining notch 22b for engaging the knotted end of the starting rope.

*Operation*

The motor is first started with the handle H disposed in its lower, inoperative position and serving to depress the power unit and driving control assembly through its engagement with the abutment arms 17g of the supporting platform. At such time the V-belt 23 is slackened and the motor, after starting, idles until it is desired to apply driving power to the cutter reel and traction wheels of the mower. No outside controls or clutches are needed with our improved device to apply driving power. The outer end of handle H is merely lifted in natural manner by the operator to dispose the hand grips conveniently for guiding operation. The slight lifting of the handle removes the weight from the restrictively swingable platform 17, freeing coil spring 20 to urge the platform upwardly and thus, tension the V-belt 23. In such slight upward swinging of the handle, power is very gradually applied to the cutter reel and traction wheels 14 without jerkiness and the mower is thus driven forwardly and the cutter blades revolved against the bed knife 10a for cutting. The operator merely retains the handle in the normal position for guiding and swings the mower frame slightly as is needed to follow the desired course. In normal operation, the entire weight of the mower is divided between the forwardly disposed traction wheels and the rear roller 27, a sufficient proportion of the weight being imposed upon the traction wheels for supplying needed traction for normal operation.

If additional tractive power is desired, as for example, when it is necessary to mow a stretch of lawn disposed on a rather steep incline, the operator merely raises handle H above the normal or convenient guiding position, thereby after abutment of the forward extremity of the handle arms 25b, with the second set of pivot studs, not utilized to pivot the handle, swinging the entire mower frame slightly forward to relieve roller 27 from the weight and consequently, placing the full load upon the traction wheels 14. If it is desired to pull the machine rearwardly with the motor running, handle H is depressed somewhat below the inoperative position thereof, thereby placing the full weight of the mower upon the rear roller 27 and enabling the machine to be pulled rearwardly.

Because of the driving connections between the cutter reel and the traction wheels 14 when the engine is not operated, the mower may be manually pushed forwardly, with little effort. If it is desired to tow the mower from one place to another, the entire frame may be swung forwardly, with the handle disposed forwardly of the traction wheels and may then be towed in a forwardly direction with the driving pinions 12 over-running their dog connections with the cutter reel.

If the forward arms 25a of the handle are pivoted to the lower set 26 of pivot studs on the frame sides, the handle grips of handle H are disposed normally in a slightly higher position to accommodate a taller operator and in such instance, the upper edges of the pivoted and flatted ends of arms 25a abut against the upper (unused) set of pivot studs 26a to limit upward swinging of handle H relatively to frame sides 7 with the same results as previously described when the handle is pivoted upon the upper pivot studs 26a.

It will be seen that the entire power unit, including the motor, fly wheel, power take-off, fuel tank and supporting platform 17, is constructed as a unitary assembly readily removable from the machine by merely loosening the retaining plates 13 which are disposed below the forward tie rod 8 of the mower upon which the supporting platform 17 is hinged at its forward edge. Thus, the assembly may be readily removed for replacement of parts or repair and the cutter reel and bed knife may likewise be conveniently exposed for sharpening, repair or replacement.

From the foregoing description, it will be seen that we have provided a very simple, improved and highly efficient power mower construction adapted for use as an attachment to hand-propelled lawn mowers as well as commercial manufacture of power mowers. Our mower does not require additional controls, clutch mechanism or elaborate power transmission mechanism as contrasted with most power mowers now extensively utilized but has the maneuverability over difficult terrain of a usual hand mower and is controlled entirely by a conventional guiding handle similar to that used in manually propelled mowers. Consequently, no involved instructions are necessary for the operator.

The inherent construction of our improved mower including the cooperation of the combined motor support and power control assembly with the conventional guiding handle and cutting reel, not only simplifies guiding and control with gradual application of power, but moreover as has been pointed out, provides a positive safeguard to prevent damage to the reel, the motor, traction wheels and driving connections when an obstruction between the bed knife and cutter reel is encountered.

It will of course, be understood that various changes may be made in the form, details, arrangement and proportions of the parts without departing from the scope of our invention.

What we claim is:

1. A removable power unit and driving control assembly for power lawn mowers of the cutter reel type comprising a motor-supporting platform having provision adjacent its forward edge for swingable connection with the forward tie rod of a lawn mower frame and adapted to be positioned across the top of said frame above the cutter reel, a motor and a fuel tank mounted on said platform, said motor having a power vertical belt pulley adjacent one end of said platform and being adapted to be connected for directly driving the cutter reel of a lawn mower through an endless driving member, said platform having a rearwardly disposed free edge positioned rearwardly of the rear tie rod of said mower frame and having an outwardly extending abutment element adjacent said rear edge disposed in the path of the guiding handle of said lawn mower for contact therewith during at least a portion of the swinging arc of said handle and spring mechanism connected with the bottom of said platform and adapted to be interposed between said platform and a part of said mower frame to urge said platform upwardly when pressure of said handle is released and to thereby tension said endless element for driving said cutter reel, said spring mechanism being tensioned relative to the weight and leverage of the outer portion of said handle rearwardly beyond said abutment element so that normally the leverage of said handle will overcome the effect of said spring to lower said motor platform to an extent to cause slackening of the belt driving element and idling of the motor.

2. The structure set forth in claim 1 wherein said platform is in the form of an inverted shell at least in part, provided with a closed bottom to define a fuel tank therein and said endless driving member comprising a removable V-belt.

3. A removable power unit and driving control assembly for lawn mowers of the cutter reel type comprising a motor-supporting platform adapted to be positioned across the top of a mower frame, having provision adjacent its forward edge for swinging connection with the top of a lawn mower frame on an axis disposed forwardly and above the cutter reel of the mower, a motor and a fuel tank mounted on said platform, said motor having a vertical power takeoff driving element adjacent one end of said platform adapted to be connected for directly driving the cutter reel of the lawn mower through a substantially vertically disposed endless driving belt, said platform having a rearwardly disposed free edge positioned below the conventional elongated guiding handle of the mower, an abutment element secured to said platform and disposed in the path of up and down swinging of said guiding handle for contact therewith during the lower portion of the swinging arc of said handle, a spring medium for swinging said platform and assembly upwardly when pressure of said handle is released from said abutment element, said mounting of said platform and motor and driving of said cutter reel from above through said endless belt, and said relation between spring medium and said platform and handle permitting the motor to continue its operation without damaging the reel and other working parts when an obstruction is encountered between the cutting reel and bed knife of the mower.

4. A power lawn mower having in combination a frame including a pair of spaced side members, a pair of traction wheels journaled in said frame, a cutter reel mounted in said frame, driving connections between said cutter reel and said traction wheels, a motor support mounted substantially horizontally across the top of said frame above said cutter mechanism and having swingable connection at its forward portion with said frame, a motor mounted on said support, an endless driving element connecting said motor with said cutter reel and of a length to be slacked for idling said motor when said motor support is swung slightly downwardly from normal operating position, means for controlling the upward and downward swinging of said motor support which includes the usual elongated guiding handle extending rearwardly and upwardly from said frame, resilient means for urging said motor support upwardly and said guiding handle having a portion thereof overhanging an element disposed adjacent the rear portion of said support, the weight and leverage of said handle rearwardly beyond said elements being sufficient to overcome the effect of said resilient means whereby when said handle is released, said support will be restrictively depressed a distance sufficient for causing said endless driving element to be slackened, a rear transverse roller mounted in said frame behind said traction wheels, the weight of said mower being in normal operation, supported conjointly by said traction wheels and said rear roller and abutment means associated with the forward and pivoted end of said guiding handle for restricting relative vertical swinging of said handle to said frame in both upward and downward directions whereby the entire weight of said mower may be selectively transferred to either said traction wheels alone or said rear roller alone when desired.

5. A power lawn mower comprising a frame including a pair of spaced side members, a cutter mechanism including a cutting reel rotatably mounted between said side members, a transverse supporting member connected between the respective side members and disposed forwardly and above the axis of said cutting reel, an engine supporting platform swingably mounted at its front on said supporting member and extending between said side frame members and over the axis of said cutting reel, an engine mounted on said platform and having a power take-off shaft disposed substantially in vertical alignment with the axis of said cutting reel, a pulley on said power take-off shaft, a pulley mounted at one end of said cutting reel of larger diameter than and in a common vertical plane with the pulley on said power take-off shaft, traction wheels mounted exterially of the side members of said frame, gear connection between said traction wheels and said cutting reel of such character that rotation of said cutting reel likewise effects rotation of said traction wheels, a pushing and guiding handle pivotally mounted on said frame for restricted swinging movement vertically, an endless driving belt trained over both of said pulleys, said belt being of such length that there is insufficient tension thereon to effect the drive of the pulley on said cutter reel when said motor support is in its lowered position, an abutment medium mounted at the rear portion of said engine support and extending outwardly therefrom in line with the arc of movement described by the inner portion of said handle when said handle is swung on its pivot, yieldable mechanism connected with said engine supporting platform for swingably urging the same upwardly for tightening of said driving belt to produce driving of said cutter reel and traction wheels from said motor, said handle having a weight and leverage rearwardly beyond said handle-abutment element of said engine platform to overcome the effect of said yieldable means whereby said platform will be swingably depressed a distance sufficient to cause said endless driving belt to be slackened until it is slightly raised manually in normal operation to release said yieldable means.

BUHEL B. BUCKINGHAM.
RALPH K. VILES.

REFERENCES CITED

The following references are of record in the file of this patent:

UNITED STATES PATENTS

| Number | Name | Date |
|---|---|---|
| 1,819,791 | Reed | Aug. 18, 1931 |
| 2,133,512 | Herge | Oct. 18, 1938 |
| 2,256,583 | Squires | Sept. 23, 1941 |